March 9, 1943.   F. W. CUTLER   2,313,051
FRUIT HANDLING EQUIPMENT
Filed July 22, 1940   2 Sheets-Sheet 2
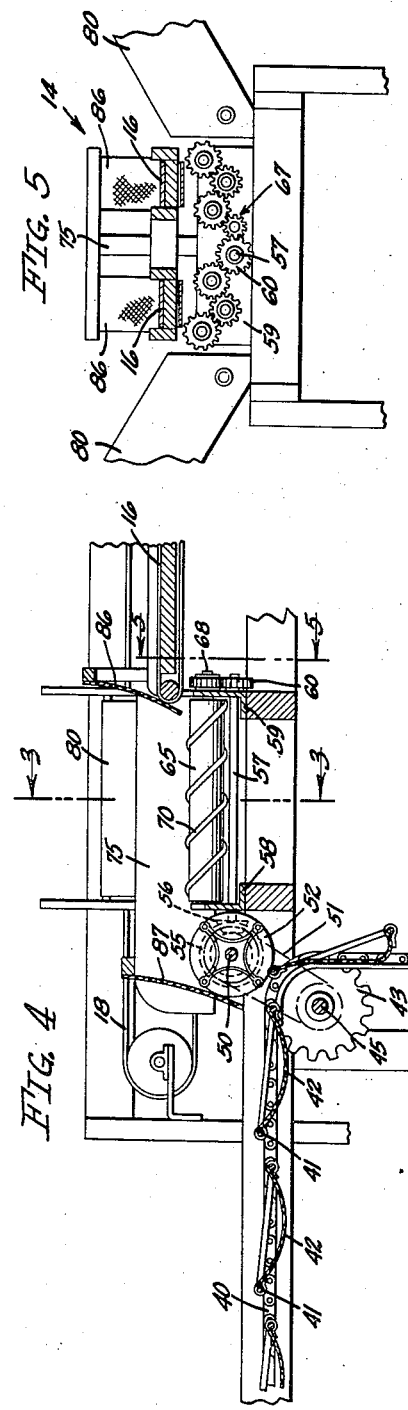
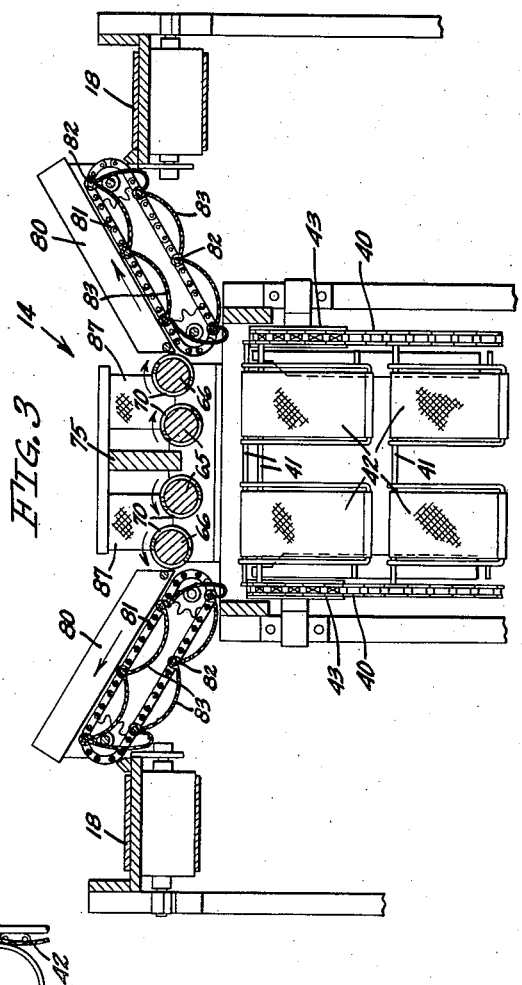
INVENTOR:
FRANK W. CUTLER
BY
ATTORNEY Patented Mar. 9, 1943

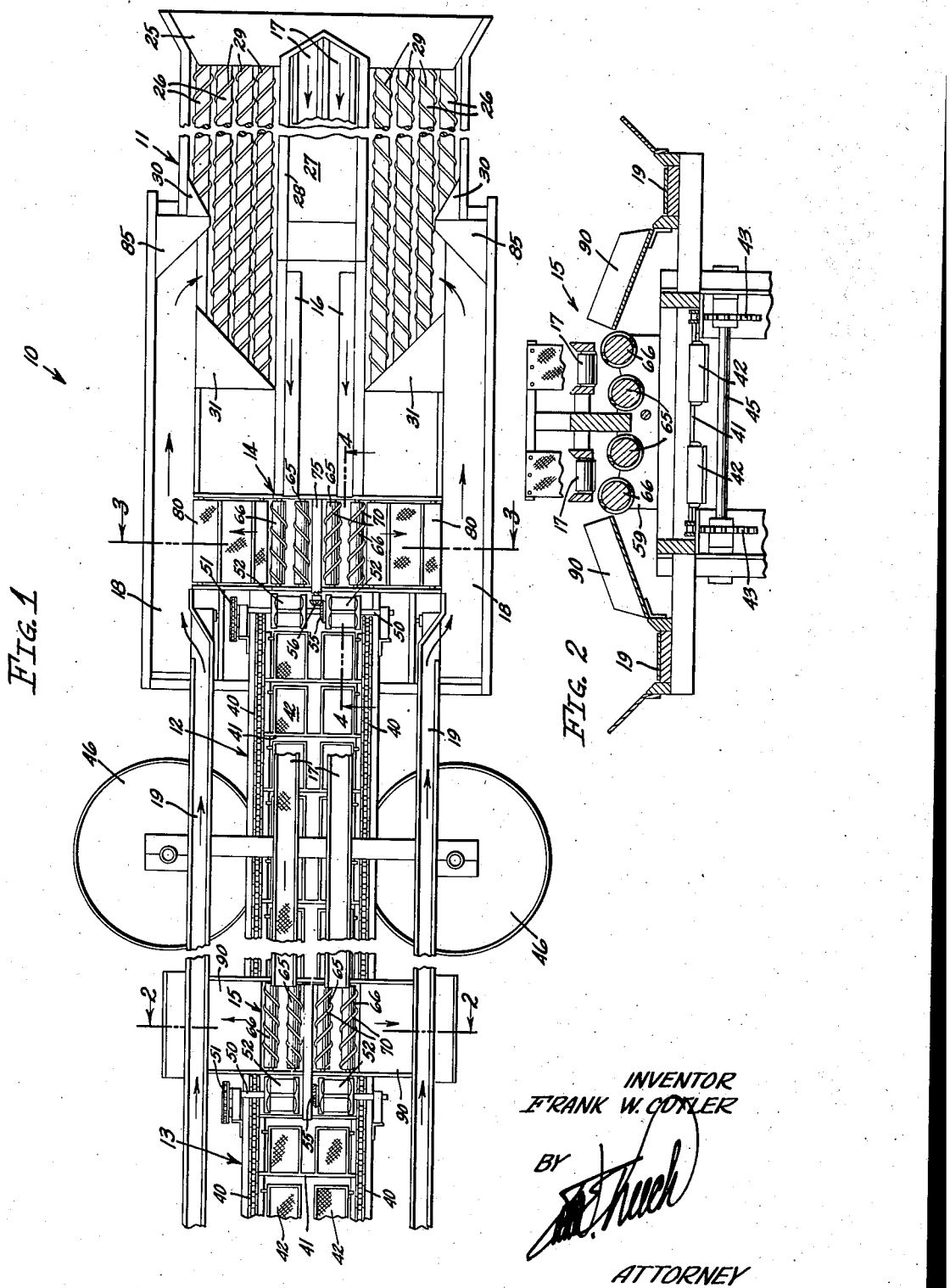

2,313,051

UNITED STATES PATENT OFFICE 2,313,051

FRUIT HANDLING EQUIPMENT

Frank W. Cutler, Winslow, Wash., assignor to Food Machinery Corporation, San Jose, Calif., a corporation of Delaware Application July 22, 1940, Serial No. 346,724

3 Claims. (Cl. 209—121)

This invention relates to the feeding of rollable articles and particularly to the feeding of such articles in single file at a predetermined uniform rate. As this invention is particularly useful in the feeding of fruit from a grader to a sizing machine, it will be disclosed as employed in this connection in the present application.

The sizer which has come into most general use for sizing apples is the Cutler sizer which operates on the weight principle. This sizer weighs each individual piece of fruit, it being necessary to feed the fruit individually to a series of weighing pockets travelling along with a conveyor. For the sizer to operate properly, only one piece of fruit may be fed to each of these pockets. Before the fruit is fed to one of these sizers, it is customary to grade the fruit by hand on a grading table from which the fruit is fed along conveyor belts to the sizer. It is extremely difficult to feed just the right amount of fruit along these conveyor belts traveling between the grading table and the sizer so that an excess amount of fruit will not arrive at the sizer causing more than one piece of fruit at a time to be deposited occasionally in one of the size pockets.

It is an object of the present invention to provide a fruit feeding device by which fruit may be conveyed from a grading table to a single file weight sizer in such a manner as to eliminate two pieces of fruit being fed to one of the sizer pockets at a time.

It is a further object of this invention to provide such a feeding device having the functions aforesaid which is adaptable to be employed in the regulated delivery of fruit to each of a series of sizing sections placed in tandem and receiving fruit from a single grading table.

The manner of accomplishing the foregoing objects, as well as further objects and advantages, will be made manifest in the following description taken in connection with the accompanying drawings, in which:

Fig. 1 is a fragmentary plan view of an assembled fruit grading and sizing apparatus incorporating a preferred embodiment of the invention.

Fig. 2 is an enlarged cross-sectional view taken on the line 2—2 of Fig. 1 and illustrating one of the feeding devices of the present invention.

Fig. 3 is an enlarged cross-sectional view taken on the line 3—3 of Fig. 1 and illustrates another of the feeding devices of the invention.

Fig. 4 is a longitudinal sectional view taken on the line 4—4 of Fig. 1 and illustrates details of construction of the feeding device shown in Fig. 3.

Fig. 5 is a detailed transverse sectional view taken on the line 5—5 of Fig. 4 and illustrates the mechanism for driving the feeding device shown in Figs. 3 and 4.

Referring specifically to the drawings, the grading and sizing apparatus 10 shown therein includes a grading unit 11, sizing units 12 and 13, feeder units 14 and 15 for feeding fruit to said sizer units, conveyor belts 16 and 17 for feeding fruit from said grader unit to said sizer units, and return belts 18 and 19 for returning excess fruit from said feeders 14 and 15 to said grader unit 11.

The grader unit 11

The grader unit 11 includes a delivery board or hopper 25 and a series of fruit supporting conveyor rollers 26 which are disposed on opposite sides of a well 27 which is surrounded by a wall 28, this well being provided to receive cull fruit sorted from that carried on the rollers 26.

The rollers 26 are rotated so that their upper faces move toward the center of the grader unit 11, thus causing threads 29, formed by wrapping rope about the rollers 26, to feed fruit in a leftward direction along these rollers. Sweep-up boards 30 and 31 sweep this fruit inwardly from over the rollers 26 and onto the conveyor belts 16 which deliver the fruit in single files to the fruit feeder unit 14. In Fig. 1, the belts 17 are broken away but these comprise part of the grader unit 11 and extend centrally and longitudinally over this unit within reach of the workers grading the fruit. In the grading operation, merchantable fruit of a certain quality is segregated out from that carried on the rollers 26 and placed on the belts 17 to be sized by the sizer section 13.

The sizer sections 12 and 13

These sizer sections are of the type well known in the art as the Cutler sizer which is almost universally used in the northwest area for sizing apples and which is adequately illustrated in my U. S. Letters Patent No. 1,184,697, issued May 23, 1916; No. 1,633,002, issued June 21, 1927; and 1,860,732, issued May 31, 1932.

The units 12 and 13 are identical. Each of them has a pair of endless conveyor chains 40 which are connected by rods 41 on each of which is pivotally mounted a pair of pockets 42, thus forming two traveling rows of these pockets while the device is in operation. The chains 40 are trained about a series of sprockets, one pair of which is mounted on a shaft 45. The pockets 42 are adapted to receive fruit as the chains 40 travel about the shaft 45. Each pocket receives a single piece of fruit and, as it travels along the pathway traversed by the upper flights of the chains 40, sizes this fruit in the manner well known in the art.

Provided along each sizer section 12 and 13 is a series of rotary bins 46, the construction and operation of which is well known in the art, these bins receiving fruit in accordance with the sizes into which it is segregated by the sizer units 12 and 13.

The fruit feeding devices 14 and 15

These devices are alike with the exceptions to be noted hereinafter. Each includes a shaft 50 which is driven as by a chain and sprocket connection 51 with the shaft 45 and has mounted thereon star wheels 52 which are in alignment with the respective rows of pockets 42 of the adjacent sizer section. Each of the star wheels 52 preferably has four pockets and the chain and sprocket connection 51 rotates the shaft 50 so that each of the pockets 42 in the adjacent sizer section is adapted to receive a piece of fruit from one of the star wheel pockets as the sizer pockets pass thereunder.

The shaft 50 carries a miter gear 55 which meshes with a miter gear 56 provided on a shaft 57. The shaft 57 is journalled in a pair of angle irons 58 and 59 provided on the frame of the apparatus 10 and has a gear 60 provided on its rear end. Also extending between and journalled in suitable bearings provided upon the angle irons 58 and 59 are two inner rollers 65 and two outer rollers 66. A system of gears 67 provided on rear extending ends of shafts 68 of these rollers mesh with and are driven by the gear wheel 60 so that the rollers 65 and 66 are driven to cause their upper surfaces to travel outwardly.

The outer rollers 66 are disposed slightly above the inner rollers 65, and all of these rollers are provided with rope threads 70 which are produced by strands of rope coiled about the rollers, the pitch of these threads on these rollers being such that a series of traveling pocket-like spaces are created in the valleys between the rollers of each of these respective pairs which travel from the delivery end of the belt 16 to the star wheels 52 located at the discharge end of these valleys.

The inner rollers 65 are separated by a septum board 75 to prevent fruit from falling inwardly from the valleys between the pairs of rollers 65 and 66. The discharge ends of the belts 16 in the fruit feeding device 14 and the belts 17 in the fruit feeding device 15 are disposed just over the receiving ends of the valleys between the rollers 65 and 66.

Disposed just about each of the outer rollers 66 in the fruit feeder 14 is a discarded-fruit elevator 80, these being properly driven during the operation of the apparatus 10 to receive any fruit passing over the outermost rollers 66 to elevate and discharge this fruit onto one of the belts 18. The elevators 80 may be of any preferred type but are shown as comprising a pair of endless chains 81 carrying rods 82 which support an endless belt of canvas 83 so that this sags somewhat between the rods 82 in the upper flight of the conveyor to receive and elevate fruit disposed on this canvas and deliver the same onto return belts 18.

These return belts travel toward the fruit grading unit 11, the fruit being swept off of the discharge belts 18 onto the rollers 26 by sweep-off boards 85.

In order to cause a gentle transfer of the fruit handled in the fruit delivery device 14, drapes 86 and 87 are provided at the discharge ends of the belts 16 and star wheels 52 as shown in Fig. 4, so that the fall of fruit being delivered at these points is broken.

The fruit feeding device 15 as shown in Figs. 1 and 2 is identical with the fruit feeding device 14, except that it is not equipped with elevators 80. In place of the elevators 80, the fruit feeding device 15 has inclined chutes 90 for delivering fruit discarded from the outermost rollers 66 onto the return belts 19, the latter being disposed at a lower level than these rollers. The return belts 19 travel rearwardly and deliver discarded fruit onto the receiving ends of the belts 18 so that this fruit is conveyed by the latter belts until it is swept therefrom by sweep-off boards 85 onto the spiral rollers 26.

Operation

The operation of the apparatus 10 is believed to be clear from the foregoing description, but will be briefly outlined as follows:

All the moving elements of the apparatus are first set in motion as above described. Fruit is then dumped as from boxes onto the dropboard 25 from which it rolls down onto the spiral rollers 26, these conveying the fruit longitudinally thereof beneath the eyes of a series of workers placed along the grader unit 11, whose function is to examine the fruit as it passes by, select culls therefrom, throwing these into the well 27, and pick the less numerous of two merchantable grades of fruit from the rollers 26, placing this fruit on the belts 17. The rest of the fruit is allowed to continue on the rollers 26 until swept off by the sweep boards 31 onto the belts 16, which deliver this fruit in single file into the valleys between the rollers 65 and 66 of the feeder device 14.

In order that the sizer sections 12 and 13 may operate at full capacity, it is desirable that each of the pockets 42 receives a piece of fruit as it passes by its respective star wheel 52. To accomplish this, it is necessary to feed an excess of fruit along the conveyors 16 and 17 to the feed device 14 and 15. The rotation of the rollers 65 and 66 has the effect of locating one piece of fruit in each of the traveling pockets formed between the spiral threads 70 as these pockets travel along toward the adjacent star wheel 52 of this device, but if there is any surplus of this fruit other than that necessary to fill each of these pockets, the action of the rollers, rotating both outwardly as they do, is to expel the excess pieces of fruit onto the adjacent conveyor 80 which delivers it to a return belt carrying the fruit back to the grader. Thus, no matter how much fruit is delivered by the belts 16 to the feeding device 14, two pieces of fruit are never delivered by this feed device to a single one of the pockets 42 of the sizer section 12. There is thus no misfunctioning of the sizer as takes place when two pieces of fruit are delivered to one pocket. Furthermore, each of these pockets always receives a piece of fruit, provided an adequate supply of fruit is fed to the rollers 65 and 66.

In the same way, the feeding device 15 feeds fruit to the sizer section 13 so as to provide each of the sizing pockets 42 in the upper flight thereof with a piece of fruit and yet prevent the delivery of two pieces of fruit to any one of these pockets. Any excess of pieces of fruit which may be delivered by the conveyors 17 to the rollers 65 and 66 of the feed device 15 are discarded outwardly into the chutes 90 and returned by belts 19 and 18 to the grader 11.

What I claim is:

1. In a sizer for sizing fruit by weight, the combination of: a flexible endless conveyor; pocket forming scale frames provided on said feed conveyor, each of said frames having a pocket for receiving a piece of fruit and being adapted to size said piece of fruit in accordance with its weight as said scale frames travel with said conveyor along a horizontal flight thereof; rotary screw feed means disposed above and parallel with said upper flight of said conveyor; means for operating said screw feed means in timed relation with said conveyor to cause one space between threads of said screw feed means to arrive at the end of said screw feed means each time a fruit receiving conveyor pocket comes up into position at the adjacent end of said upper flight; a star wheel mounted over said adjacent end of said upper flight and between said flight and the discharge end of said screw feed means, the latter being aligned with said star wheel and said pockets in a given vertical plane, means for rotating said star wheel in timed relation with said screw feed means and said conveyor; means for delivering fruit to said screw feed means at a rate substantially in excess of the rate at which said conveyor can handle the fruit thereby causing the fruit to overflow laterally from said fruit feed means but assuring the delivery of a piece of fruit from said screw feed means to said star wheel and from said star wheel to each conveyor pocket, when the latter arrives in position for receiving this; and means for receiving the fruit overflowing laterally from said screw feed means and returning said overflow to said fruit delivering means.

2. In a sizer for sizing fruit by weight, the combination of: a flexible endless conveyor; pocket forming scale frames provided on said conveyor, each of said frames having a pocket for receiving a piece of fruit and being adapted to size said piece of fruit in accordance with its weight as said scale frames travel with said conveyor along a horizontal flight thereof; a pair of rollers spaced to form a valley therebetween said rollers being disposed above and parallel with said upper flight of said conveyor; helical threads provided on said rollers; means for rotating said rollers in timed relation with said conveyor to cause one piece of fruit to be delivered from said valley toward said conveyor, each time a fruit receiving pocket comes up into position at the adjacent end of said upper flight; means for feeding fruit to said valley; and a star wheel mounted over said adjacent end of said upper flight and between said flight and said pair of rollers, said valley said star wheel and said pockets all being aligned in a given vertical plane; means for rotating said star wheel in timed relation with said conveyor and said rollers so that each piece of fruit delivered from the valley between said rollers, as aforesaid, is received by said star wheel and gently lowered by said star wheel into the next pocket coming into fruit-receiving position at the adjacent end of said upper flight of said conveyor, said rollers rotating so that upper surfaces thereof travel in a given direction, the roller which is disposed in said direction from the other roller being mounted on an axis substantially higher than said other roller; wall means disposed along said pair of rollers adjacent said other roller to prevent fruit being accidentally discharged from over said other roller, the space along the outer edge of said higher roller being left free to permit fruit to be discharged thereover where an excess of fruit is fed to the valley between said rollers; and means for receiving fruit thus discharged and returning said fruit to the means for feeding fruit to the valley between said rollers.

3. A combination as in claim 1 in which said screw feed means comprises a pair of rollers, at least one of which is provided with screw threads, and means for rotating said rollers in a common direction; and wall means disposed along the side of said screw feed means away from which upper surfaces of said rollers rotate, the roller of said pair disposed in said direction from the other roller being mounted on an axis which is higher than that of the other roller, said fruit return means being adapted to receive fruit from said higher roller.

FRANK W. CUTLER.